(12) United States Patent
Soittu (10) Patent No.: US 8,342,781 B2
(45) Date of Patent: Jan. 1, 2013

(54) DRILL BODY

(75) Inventor: Kari Soittu, Mölnlycke (SE)

(73) Assignee: Sandvik Intellectual Property AB, Sandviken (SE)

( * ) Notice: Subject to any disclaimer, the term of this patent is extended or adjusted under 35 U.S.C. 154(b) by 832 days.

(21) Appl. No.: 12/385,437

(22) Filed: Apr. 8, 2009

(65) Prior Publication Data
US 2009/0279965 A1 Nov. 12, 2009

(30) Foreign Application Priority Data

May 9, 2008 (SE) ...................................... 0801042

(51) Int. Cl.
*B23B 51/02* (2006.01)
*B23B 51/06* (2006.01)

(52) U.S. Cl. .......... 408/59; 408/211; 408/225; 408/228; 408/230

(58) Field of Classification Search .................... 408/59, 408/211–213, 223–225, 227, 229, 230, 56, 408/57; *B23B 51/02, 51/06*
See application file for complete search history.

(56) References Cited

U.S. PATENT DOCUMENTS

| 2,230,645 | A | * | 2/1941 | Jones | 408/212 |
| 2,600,286 | A | * | 6/1952 | Weiland | 408/211 |
| 2,613,710 | A | * | 10/1952 | Emmons | 408/213 |
| 2,652,083 | A | * | 9/1953 | Emmons | 408/211 |
| 4,968,193 | A | * | 11/1990 | Chaconas et al. | 408/211 |
| 5,288,183 | A | * | 2/1994 | Chaconas et al. | 408/211 |
| 5,980,166 | A | * | 11/1999 | Ogura | 408/57 |
| 6,050,754 | A | * | 4/2000 | Thomas | 408/230 |
| 6,056,486 | A | * | 5/2000 | Colvin | 408/59 |
| 6,113,321 | A | * | 9/2000 | Mulroy et al. | 408/211 |
| 6,857,832 | B2 | * | 2/2005 | Nygård | 408/211 |
| 7,267,514 | B2 | * | 9/2007 | Wetzl et al. | 408/225 |
| 2005/0053438 | A1 | * | 3/2005 | Wetzl et al. | 408/225 |
| 2009/0028654 | A1 | * | 1/2009 | Turrini | 408/1 R |
| 2009/0087275 | A1 | * | 4/2009 | Goulbourne | 408/230 |

FOREIGN PATENT DOCUMENTS
DE 10106035 A1 * 8/2002
(Continued)

*Primary Examiner* — Eric A Gates
(74) *Attorney, Agent, or Firm* — Morgan, Lewis & Bockius LLP (57) ABSTRACT

A drill body for chip removing machining, including a rotationally symmetrical envelope surface and front and rear ends between which a center axis extends, around which the envelope surface is rotatable in a predetermined direction of rotation. A head is formed in the front end that includes two cutting edges, each one of which includes a first part edge and a second part edge. The first part edge is included in a central tip part having a front end portion situated along the center axis. The second part edge extends between a peripheral end point positioned along the envelope surface and a radially inner end point where the second part edge transforms into the first part edge. The two first part edges converge at a positive nose angle ($\alpha$) in an axially forward direction, and the two second part edges diverge at a negative angle ($\beta$) in the axially forward direction. Each cutting edge is delimited between a chip surface adjacent to a chip flute countersunk in the envelope surface, and a primary clearance surface that transforms into a secondary clearance surface situated rotationally behind the primary clearance surface. Each primary clearance surface includes two part surfaces which mutually form an obtuse angle ($\chi$), and which meet each other in a first chute bottom that runs rotationally rearward from the inner end point of the second part edge. A second chute bottom extends in the extension of the first chute bottom and separates two second part surfaces included in the secondary clearance surface.

4 Claims, 5 Drawing Sheets

FOREIGN PATENT DOCUMENTS

| | | | |
|---|---|---|---|
| EP | 88037 A1 | * | 9/1983 |
| EP | 137898 A1 | * | 4/1985 |
| JP | 02237709 A | * | 9/1990 |
| JP | 09103907 A | * | 4/1997 |
| WO | 01/91960 | | 12/2001 |
| WO | 2007/015095 | | 2/2007 |

* cited by examiner

DRILL BODY

This application claims priority under 35 U.S.C. §119 to Swedish Patent Application No. 0801042-3, filed on May 9, 2008, which is incorporated by reference herein in its entirety.

FIELD OF THE INVENTION

The present invention relates generally to a drill body for chip removing machining of the type that includes a rotationally symmetrical envelope surface and front and rear ends between which a center axis extends around which the same is rotatable in a predetermined direction of rotation. A head is formed in the front end and includes two cutting edges, each one of which includes two part edges, a first one of which is included in a central tip part having a front end portion situated along the center axis, and a second one of which extends between a peripheral end point positioned along the envelope surface and a radially inner end point, where the same transforms into the first part edge. The two first part edges converge at a positive nose angle in the direction axially forward, whereas the two second part edges diverge at a negative angle in the same direction. Each cutting edge is delimited between, on one hand, a chip surface adjacent to a chip flute countersunk in the envelope surface, and on the other hand a primary clearance surface that transforms into a secondary clearance surface situated rotationally behind. The primary clearance surface includes two part surfaces which mutually form an obtuse angle and which meet each other in a chute bottom that runs rotationally rearward from the inner end point of the peripheral part edge as seen in the direction of rotation.

It should be pointed out that the concept "drill body" should be interpreted in a wide sense. Thus, the drill body may be realized not only in the form of solid drills of different materials, such as cemented carbide, high speed steel, etc., but also in the form of so-called loose tops, i.e., a relatively short body of, for instance, cemented carbide that is detachably mounted on the front end of a longer shank. Furthermore, the drill body may be semi-permanently connected with another body, e.g., by soldering. It should also be mentioned that the type of drill bodies in question primarily are used for drilling, e.g., short-hole drilling in metal, such as steel, cast iron, aluminium, titanium and the like. Such materials have different machinability depending on a number of different factors, such as their metallurgical, chemical and mechanical properties, heat treatment, additives, inclusions, surface shell, etc.; something which usually gives rise to most varying problems and difficulties in connection with all forms of chip removing or cutting machining, including drilling. For instance, aluminium having low contents of silicon ($\leq$11%) has a tendency to stick on and around the cutting edges and gives rise to detrimental loose-edge formation on the same.

BACKGROUND OF THE INVENTION

An older type of drill body, which is particularly for machining of aluminium, is disclosed in International Patent Application Publication No. WO 01/91960. However, in this case the tip part of the drill head is extraordinary acute, on one hand, so far that the positive nose angle thereof is limited to approx. 90°, and on the other hand so far that the base width thereof amounts to only approx. ⅓ of the diameter of the drill body. Furthermore, the tip part is fairly thin by being delimited between two face ground surfaces, which are situated comparatively near each other. This results in the mouths of possible cooling liquid ducts having to be located beside the tip part, and therefore the cooling liquid has difficulty to cool and lubricate at least the front portion of the tip part. In other words, the loose-edge formation on the drill body may become troublesome.

A further developed drill body of the type initially mentioned is further known by International Patent Application Publication No. WO 2007/015095 A1. In this case, the tip part has a considerably wider base (50-90% of the diameter), as well as a greater nose angle (preferably 130°) than the tip part of the drill body according to International Patent Application Publication No. WO 01/91960. In such a way, the mouths of the possible cooling liquid ducts can be placed comparatively near the center axis, viz. closer to the same than the periphery. For this reason, the lubricating and cooling liquid can be brought to flush over the two part edges of the tip part in a more efficient way while counteracting loose-edge formation. However, a disadvantage of this further developed drill body is that the individual peripheral part edge, which is negatively angled, has a very small radial extension, as well as is formed on a material portion, the tangential extension of which is limited by the width of the primary clearance surface, because the same extends only up to the borderline of the primary clearance surface against the secondary clearance surface, but not along the last-mentioned one. This means that the material portion in which the peripheral part edge is included will be diminutive and fairly weak. Since the diameter of the drill body is small (e.g., within the range of 5-10 mm) and the primary clearance surface has a width of some tenths of a mm, the material portion in question may easily be damaged or entirely destroyed not only in connection with hole making but also in connection with the handling of the drill body in different situations.

The present invention aims at obviating the shortcomings of the drill body known by International Patent Application Publication No. WO 2007/015095 A1 and at providing an improved drill body. Therefore, an object of the invention to provide a drill body, the peripheral and negatively angled part edges of which are strong to give the drill body an optimum service life, and which is particularly suitable for the machining of aluminium, in particular soft aluminium having low content of silicon, without giving rise to troublesome loose-edge formation.

Another object of the invention is to provide a drill body that can operate with moderate cutting forces and that centers in a reliable way in connection with the entering of a workpiece to be machined.

Yet another object of the invention is to provide a drill body that minimizes the risk of chip jamming and burr formation, as well as reduces not only the axial cutting forces but also the radial ones. In other words, the drill body should be possible to be fed into the workpiece to be machined in a smooth way without the tool being pressed out radially to too great an extent.

SUMMARY OF THE INVENTION

In an embodiment, the invention provides a drill body for chip removing machining, including a rotationally symmetrical envelope surface and front and rear ends between which a center axis extends, around which the envelope surface is rotatable in a predetermined direction of rotation. A head is formed in the front end that includes two cutting edges, each one of which includes a first part edge and a second part edge. The first part edge is included in a central tip part having a front end portion situated along the center axis. The second part edge extends between a peripheral end point positioned along the envelope surface and a radially inner end point where the second part edge transforms into the first part edge.

The two first part edges converge at a positive nose angle (α) in an axially forward direction, and the two second part edges diverge at a negative angle (β) in the axially forward direction. Each cutting edge is delimited between a chip surface adjacent to a chip flute countersunk in the envelope surface, and a primary clearance surface that transforms into a secondary clearance surface situated rotationally behind the primary clearance surface. Each primary clearance surface includes two part surfaces which mutually form an obtuse angle (χ), and which meet each other in a first chute bottom that runs rotationally rearward from the inner end point of the second part edge. A second chute bottom extends in the extension of the first chute bottom and separates two second part surfaces included in the secondary clearance surface.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
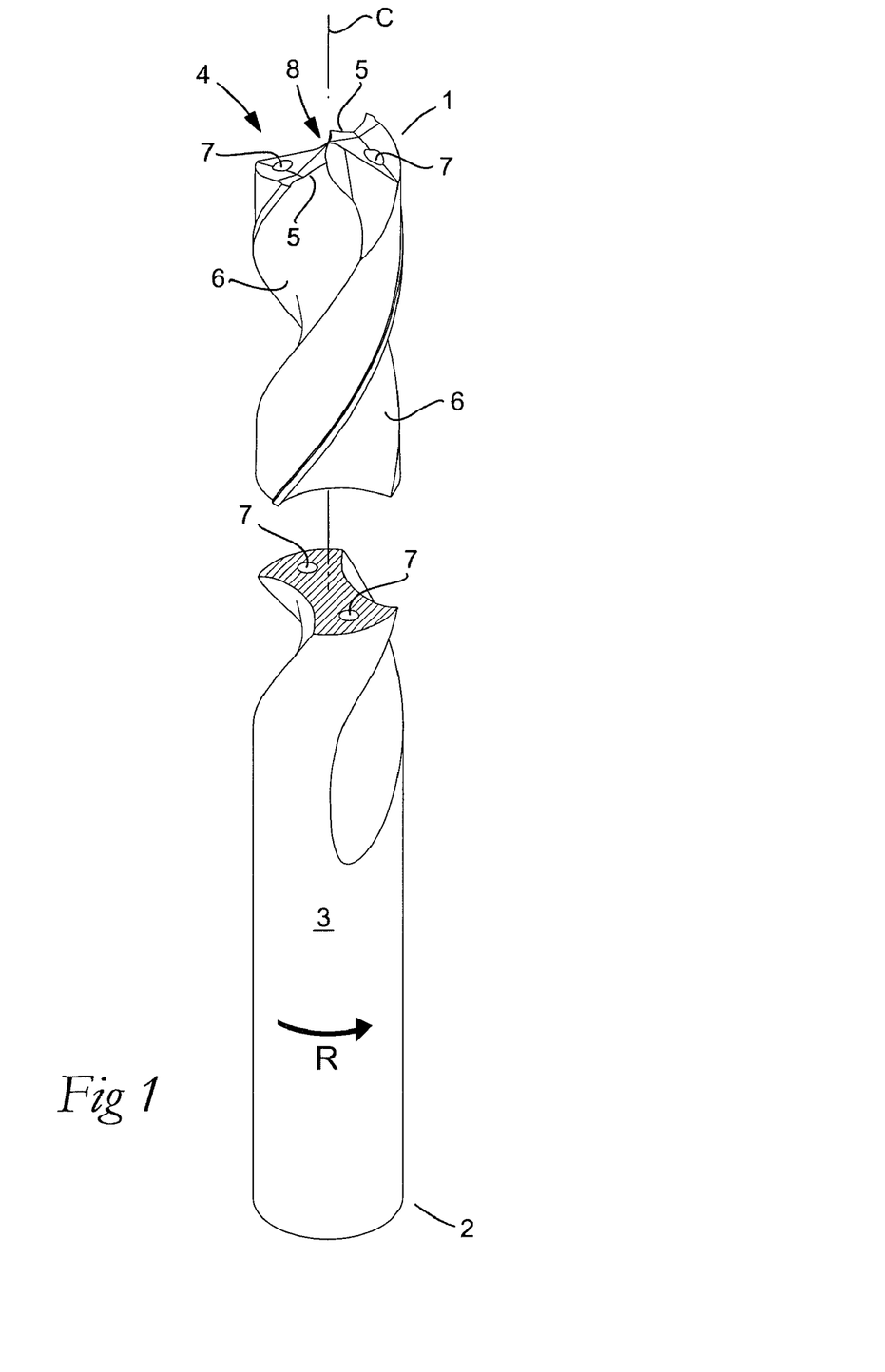
FIG. 1 is a partly sectioned perspective view of a drill body according to an embodiment of the invention.

In an embodiment, the drill body according to the invention is in the form of a twist drill, which henceforth in brief only is denominated "drill", and which includes front and rear ends 1, 2 between which a center axis C extends around which the drill is rotatable in a predetermined direction of rotation R. A rotationally symmetrical envelope surface 3 is concentric with the center axis C. Along the greater part of the length of the drill, envelope surface 3 is cylindrical, but transforms in front into a slightly conical, forwardly diverging section, which is not perceivable to the naked eye. The diametrical conicity of the front section can be as small as 0.06/100 mm. In the front end 1, the drill is formed with a head in its entirety designated 4, which includes two identical cutting edges 5. In front of each cutting edge, as viewed in the direction of rotation, a chip flute 6 is formed, which in this case is spiral or helicoidal having a certain pitch, suitable for the purpose. In the shown embodiment, each cutting edge co-operates with an internal duct 7 for supply of a fluid, in particular liquid, to the front drill head 4, more precisely with the purpose of lubricating and cooling the same as well as the material from which chips are removed, as well as to contribute to the chip evacuation. As is clearly seen in FIG. 1, the ducts 7 mouth in the area behind the individual cutting edge, as viewed in the direction of rotation R. The rear part of the drill, which lacks chip flutes, forms a fixing part for fixation in a machine, by which the drill can be set in rotation.

Figure 3:
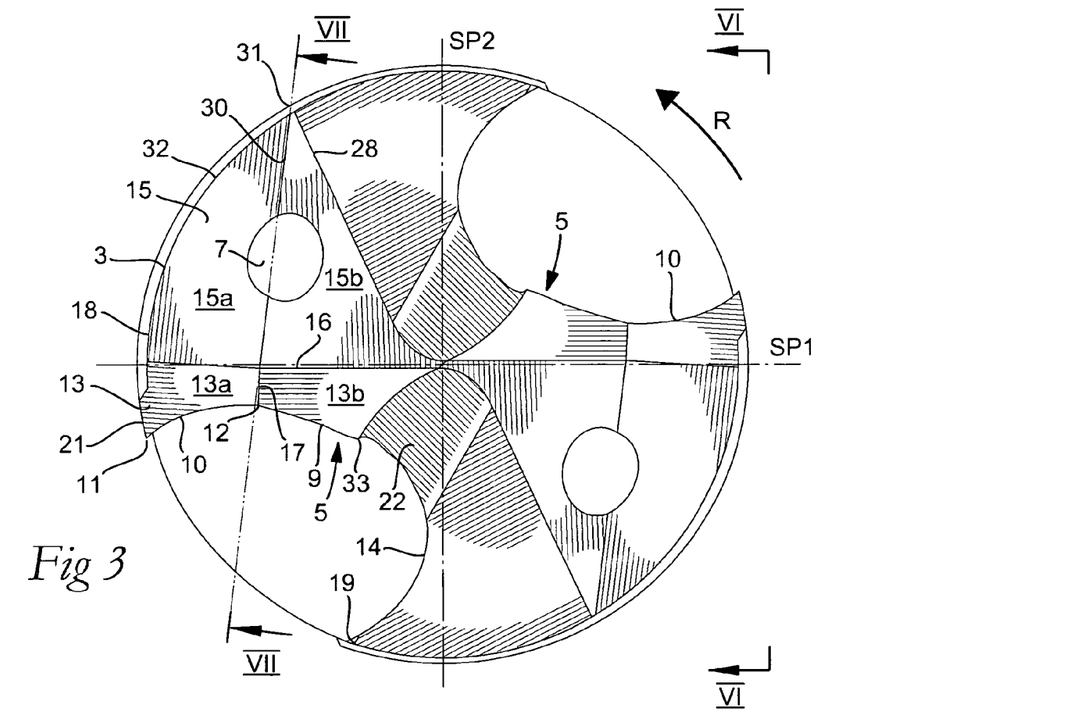
FIG. 3 is an end view of the same head.
Figure 4:
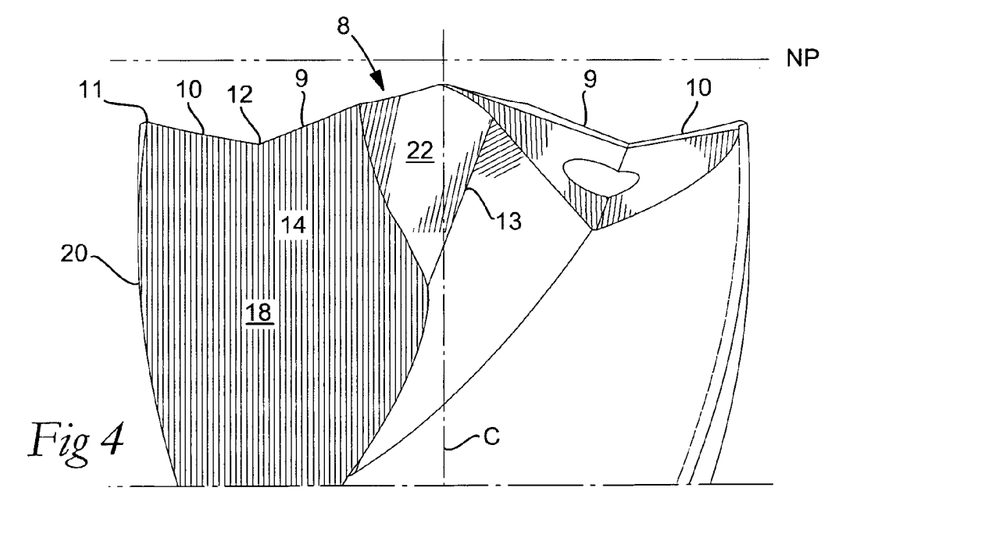
FIG. 4 is a partial side view of FIG. 3.
Figure 5:
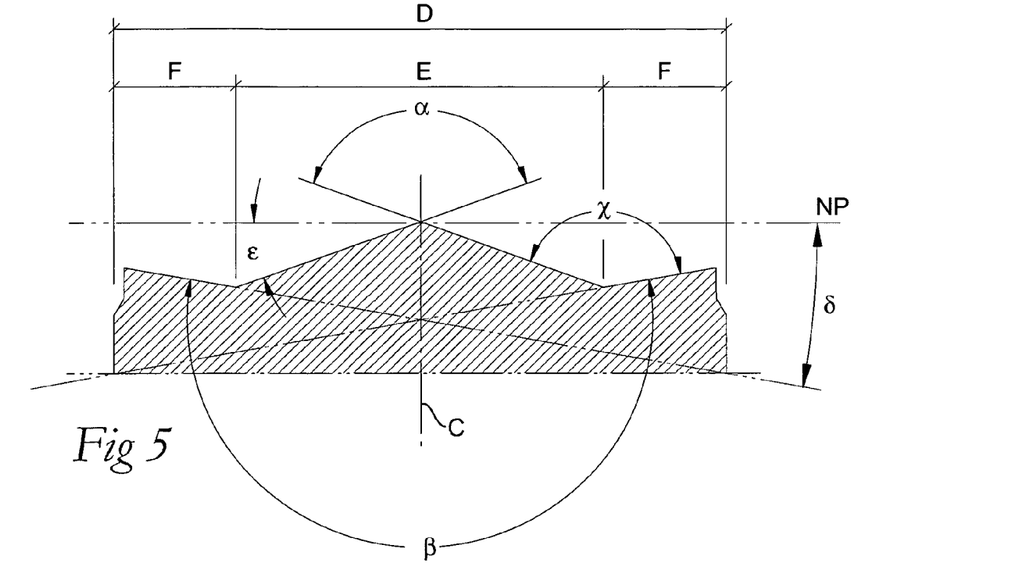
FIG. 5 is a simplified silhouette picture showing certain of the geometrical data of the drill head.
Figure 6:
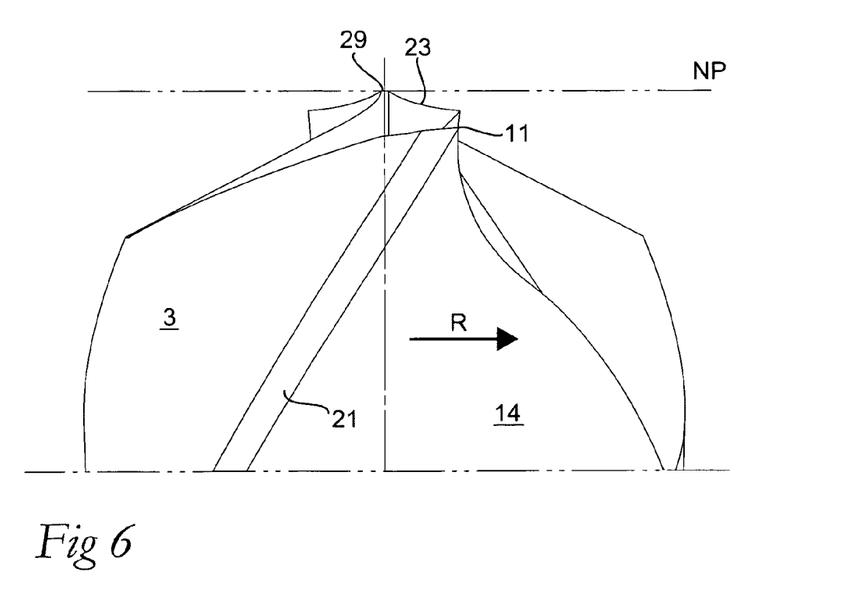
FIG. 6 is a partial side view VI-VI in FIG. 3.

In FIGS. 4 and 5, NP designates a geometric normal plane, which extends perpendicularly to the center axis C and may be located in arbitrary spots along the same. Furthermore, SP1 and SP2 (see FIGS. 3 and 8) designate two symmetry planes, which intersect each other at right angles, more precisely along the center axis C. Hence, it follows that the normal plane NP forms an angle of 90° with each one of the symmetry planes. The individual symmetry plane divides the drill head 4 into two mirror-symmetrical halves, i.e., two halves that are identical, although mirror-inverted in relation to each other.

In the head 4, a centrally situated tip part 8 is included, the nose angle of which (see FIG. 5) is obtuse and designated a. Each individual cutting edge 5 includes two part edges, a first one 9 of which is included in the central tip part 8 and a second one 10 of which extends between a peripheral end point 11 positioned along the envelope surface 3 and a radially inner end point 12, where the same transforms into the first part edge 9. The two first part edges 9 converge in the direction axially forward to define the nose angle α, which can be described as positive. However, the two peripheral part edges 10 diverge while forming a negative angle of divergence β (see FIG. 5). The individual cutting edge 5 is delimited between a primary clearance surface generally designated 13 and at least one chip surface, which in this case is a part of a surface 14 that delimits the chip flute 6 connecting to the cutting edge. In FIG. 3, it is seen that the primary clearance surface 13 transforms into a secondary clearance surface generally designated 15, viz. via a borderline 16. In order to provide the negative angle of divergence β between the two peripheral part edges 10, each primary clearance surface 13 is broken into two part surfaces 13a, 13b, which mutually form an obtuse angle and meet each other in a chute bottom 17, which runs rearward from the end point 12, as viewed in the direction of rotation. In the example shown, the chute bottom 17 is in the form of a straight borderline, which is formed by face grinding the part surfaces 13a, 13b. It should also be noted that the individual fluid duct 7 mouths in the area behind the primary clearance surface 13.

Figure 2:
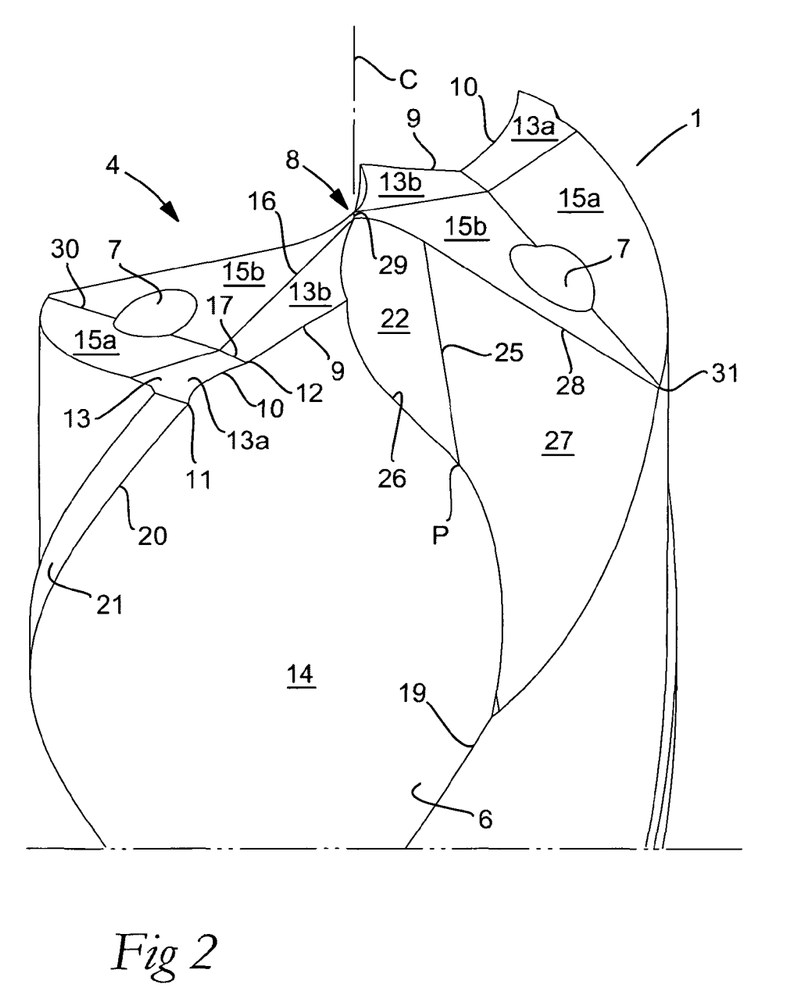
FIG. 2 is an enlarged, partial perspective view showing the geometry of a head included in the drill body.

Each one of the chip flutes 6, which run helicoidally in the length extension of the drill body, are delimited by a cross-sectionally concavely arched surface 14 (in which the chip surface of the cutting edge in this case is included). As is seen in FIGS. 2 and 3, the delimitation surface 14 extends along a ellipse-like curve between peripheral edge lines 19, 20, the first-mentioned one of which moves in front of the last-mentioned one during the rotation of the drill. The edge line or borderline 20 (see FIG. 2), which is connected to a cutting edge 5, is included in a margin or guide land 21, which not only has the purpose of guiding the drill in the recessed hole, but also levelling the generated hole wall. Behind each margin 21, the envelope surface 3 forms a so-called clearance surface, the diameter of which is smaller than the diameter of the margin.

As previously has been pointed out, known drills are impaired by the aggravating disadvantage that the peripheral, negatively angled part edges are included in diminutive material portions that easily can be damaged.

In contrast to the known drills, the drill according to the embodiment of the invention includes not only a first chute bottom 17 between the two part surfaces 13a, 13b of the primary clearance surface 13, but also a second chute bottom 30 (see FIGS. 2 and 3), which extends in extension of the first one and separates two second part surfaces 15a, 15b included in the secondary clearance surface. Also the two part surfaces 15a, 15b are advantageously in the form of plane, ground surfaces, which meet each other along a straight turning line that forms the chute bottom 30.

Figure 8:
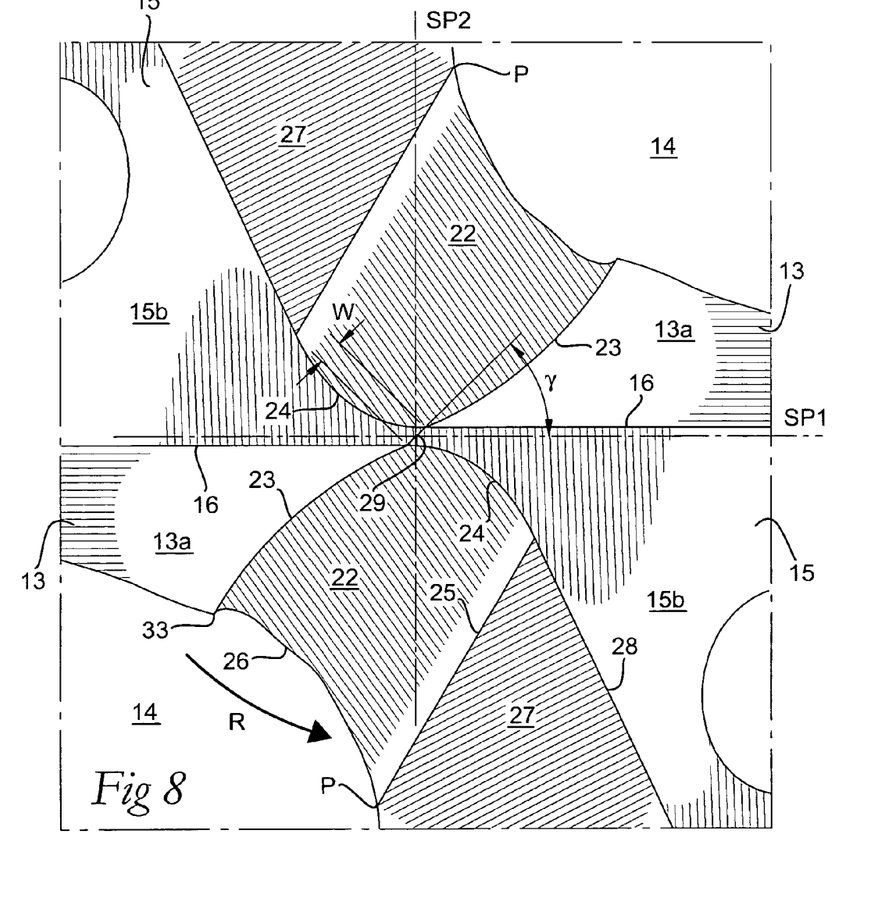
FIG. 8 is an enlarged detailed end view showing the design of the central part of the drill head.

Adjacent to the axially front end of each chip flute 6, a so-called web thinning 22 is formed in the form of a circular ground and concavely arched surface, which, as is seen in FIG. 8, is surrounded by four borderlines 23, 24, 25 and 26, the last-mentioned one of which forms a border between the surfaces 14 and 22. Furthermore, the line 25 forms a border between the surface 22 and a suitably plane surface 27, which serves as a transition surface between the secondary clearance surface 15 of the drill head and the surface 14 that delimits the chip flute 6. In this case, the borderline between the surfaces 15 and 27 is straight and designated 28 because also the surface 27 is face ground. The slightly curved line 23 forms in turn a border between the surface 22 and the primary clearance surface 13 of one of the two cutting edges. Finally, the narrower curved line 24 forms a border between the surface 22 and the secondary clearance surface behind the second cutting edge. The borderlines 25 and 26 converge at a point P.

In the shown embodiment, the second chute bottom 30 runs between the first chute bottom 17 and a point 31 where the borderline 28 ends peripherally. Because the part surface 15b as well as the transition surface 27, in this case, are plane, the borderline 28 becomes straight. In such a way, the part surface 15b generally obtains the shape of a triangle, in which the borderline 28 forms a hypotenuse and the borderlines 16, 30 catheters. The part surface 15a is in turn delimited by the two straight borderlines 16, 30 as well as the circular arc-shaped borderline 32 along the envelope surface 3. Thus, the part surface 15a gets the shape of a truncated crescent.

As is further seen in FIG. 8, the two secondary clearance surfaces 15 meet each other along a turning line 29, which extends at an angle γ to the symmetry plane SP1. At the two opposite end points thereof, line 29 transforms into those borderlines 23 that form borders to the two primary clearance surfaces 13. In practice, the line 29 forms a so-called chisel edge, which forms the axially foremost element of the drill head, and which not only centers the drill when this is to enter a workpiece to be machined, but also, thanks to the smallness thereof, contributes to reducing the axial as well as the radial cutting forces.

In FIG. 5, D designates the diameter of the drill, while E designates the width or diameter of the tip part 8. In the shown, preferred embodiment, E amounts to 56% of D. This means that the length F of the individual, peripheral part edge 10, as viewed in vertical projection, amounts to 22% of D. However, the real length is somewhat greater, because the part edge is somewhat inclined in relation to the normal plane NP. Within the scope of the invention, the base width E varies up as well as down from the above-mentioned value. However, E should not be more than 70%, but neither be less than 50%. On one hand, E should in practice be less than 67.5%, suitably 65% of D, but on the other hand be greater than 52.5%, suitably 55%. F should amount to at least 15% and at most 25% of D.

Furthermore, in the example, the positive nose angle α amounts to 140°, involving that the individual part edge 9 forms an angle ε amounting to 20° with the neutral plane NP. Also these angles may vary within the scope of the invention. However, α should amount to at least 120° and at most 160°. Advantageously, the angle α is within the range of 125°-150°, suitably 130°-145°.

In the embodiment, the negative angle of divergence β amounts to 200°, from which it follows that each peripheral part edge 10 is inclined at an angle δ amounting to 10° in relation to the neutral plane NP. Also β may deviate from 200°, but should however amount to at least 190° and at most 210°. In practice, β should amount to at least 192.5°, preferably at least 195°, however without being more than 207.5°, suitably 205°.

When α amounts to 140° and β to 200°, the pairs of part edges 9, 10 mutually form an obtuse angle χ amounting to 150°. Also χ may vary, e.g., within the range of 140°-160°, suitably 145°-155°.

By limiting the angle δ to the range of 5°-15° and simultaneously limiting the base width E of the tip part 8 to at most 70% of D, from which it follows that F amounts to at least 15% of D, at the same time as the individual, peripheral part edge 10 on the clearance side thereof is followed by an ample quantity of material (e.g., cemented carbide) thanks to the presence of the peripheral part surface 15a in extension of the peripheral part surface 13a of the primary clearance surface, a wide and strong, negatively cutting peripheral part edge is obtained. The strength of this periphery part edge 10—in comparison with the corresponding part edge of known drills—manifests itself not only in an increased service life in connection with the operative work of the drill, but also in a reduced risk of damage in connection with handling, e.g., tool exchange, regrinding, storage, etc.

Figure 7:
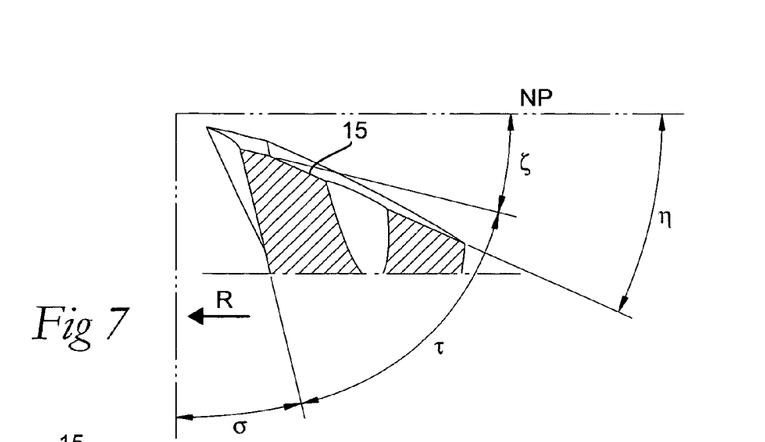
FIG. 7 is a partial section VII-VII in FIG. 3.

In FIG. 7 (see also the section VII-VII in FIG. 3), it is seen that the clearance angle η of the secondary clearance surface 15 is greater than the clearance angle ζ of the primary clearance surface 13. Thus, in the example, η amounts to approx. 17° and ζ to approx. 6°. Also these angles may individually vary within limited intervals. Furthermore, in the example, the rake angle σ amounts to approx. 23°, from which it follows that the cutting edge angle τ amounts to approx. 61°. This cutting edge angle τ increases with decreasing angles δ and ζ, respectively, and vice versa. In practice, τ should be within the interval of 55°-65°, suitably 58°-63°.

In the drill according to the embodiment, the secondary clearance surface 15 (see FIG. 3) has an area that is considerably greater than the area of the primary clearance surface 13. Thus, the area of the surface 15 may be at least three times greater than the area of the surface 13, wherein the chute bottom 30 of the secondary clearance surface 15 should be at least four times longer than the chute bottom 17 of the primary clearance surface 13. In the example, the chute bottom 30 is approximately six times longer than the chute bottom 17.

Furthermore, it should be noted that the individual fluid duct 7 mouths at a point situated along the chute bottom 30 of the secondary clearance surface 15. In the shown embodiment, the duct mouth is situated approximately halfway between the two opposite ends of the chute bottom 30. Furthermore, it should be noted that the greater part of the cross-section of the duct 7 intersects the part surface 15b that is situated closest to the center of the drill. Therefore, the cooling liquid can efficiently be flushed in the direction inward along the part surface 15b and, without obstruction from, for instance, the machined bottom of the hole, reach the central portion of the tip part.

Reference is now made again to FIG. 8, from which it is seen that the chisel edge 29, which forms the most foremost portion of the tip part 8, is inclined at an angle γ, which in this case amounts to approx. 45°. The width W of the chisel edge is, in this case, minimal as a consequence of the web thinnings 22 having been ground in, in the immediate vicinity of the symmetry plane SP1. In practice, the chisel edge 29 may advantageously have a length that is less than 1% of the diameter D of the drill. In absolute measures, W may be within the range of 0.05-0.3 mm depending on the diameter of the drill. In this connection, it should be noted that the borderline 16 between the clearance surfaces 13, 15 is situated in front of the symmetry plane SP1 as viewed in the direction of rotation.

Thanks to the grinding in of the web thinning 22, the part edge 9 included in the tip part 8 will in turn be divided into two subordinated, arched cutting edge portions, which meet each other in the point 33 (see FIGS. 3 and 8) and which are, on one hand, the part of the cutting edge line of the arched part edge 9 that extends between the points 12 and 33, and on the other hand the likewise arched borderline 23 that also forms a cutting edge line along which chip removal is effected. Accordingly, the portion of the web-thinning surface 22 that is in front of the cutting edge line 23, as viewed in the direction of rotation, forms a concave chip surface, which, together with the connecting part of the part surface 13b of the primary clearance surface, forms a cutting edge. By the fact that the part edge 9 of the tip part 8 is broken in this way at the point 33 and transforms into the curved cutting edge portion 23, the start chip generated upon the entering of the tip part into the workpiece to be machined will be directed into the web thinning 22 and be subjected to an aim of moving axially rather than radially. In other words, already the start chip is guided in a smooth way into the chip flute 6 positioned axially behind the drill head. In addition, the full chip may be weakened or even be broken at the breaking point 33, something that additionally improves the chip evacuation as a consequence of reduced chip size. In addition, the smallness of the chisel edge guarantees a limitation of not only the loose-edge formation but also the axial cutting forces and the radial force resultants thereof.

By the existence of the negatively cutting, peripheral part edges, the advantageous function of the known drills is retained to push the peripheral part of the chip in the direction inward instead of outward against the hole wall, at the same time as the periphery part edges become strong and give the drill a long service life, besides which the risk of handling damage of the drill is minimized. In addition to this, troublesome loose-edge formation is counteracted, in particular during machining of soft aluminium, thanks to, among other things, the efficient liquid flushing of the part of the tip part that surrounds the front chisel edge. Particularly, the drill according to the embodiment gives a considerably improved chip guiding as a consequence of, on one hand, the fact that the concavely arched shape of the chip flute gives the individual cutting edge an arc-shape, and on the other hand that the web thinning in the vicinity of the center of the drill breaks the cutting edge into an additional arched portion in the immediate vicinity of the chisel edge.

The drill according to the embodiment can also be used for drilling in composite materials of different types, in addition to miscellaneous metals. However, the same is not intended or suitable for drilling in wood, concrete and the like, i.e., materials from which chips cannot be removed by plasticizing. As has been pointed out by way of introduction, the drill or the drill body in question may be manufactured from different materials, such as cemented carbide, high speed steel, and be implemented in the form of different products, such as solid drills, loose tops, etc. Furthermore, it should be pointed out that the drill body can be made with more than two cutting edges provided that these are placed symmetrically in the same way as the two cutting edges of the described, symmetrical drill. (i.e. provided that the drill body in question is formed with a head or front portion basically having the geometrical design described above). Although the drill body in the exemplified, preferred embodiment is formed with fluid ducts, the same may also be realized without such ducts.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A drill body for chip removing machining, comprising:
   a rotationally symmetrical envelope surface and front and rear ends between which a center axis extends, around which the drill body is rotatable in a predetermined direction of rotation;
   a head formed in the front end that includes two cutting edges, each one of which includes a first part edge and a second part edge, the first part edge being included in a central tip part having a front end portion situated along the center axis, the second part edge extending between a peripheral end point positioned along the envelope surface and a radially inner end point where the second part edge transforms into the first part edge, the two first part edges converging at a positive nose angle ($\alpha$) in an axially forward direction, and the two second part edges diverging at a negative angle ($\beta$) in the axially forward direction;
   each cutting edge being delimited between a chip surface adjacent to a chip flute countersunk in the envelope surface, and a primary clearance surface that transforms into a secondary clearance surface situated rotationally behind the primary clearance surface;
   each primary clearance surface including two part surfaces which mutually form an obtuse angle ($\chi$), and which meet each other in a first chute bottom that runs rotationally rearward from the inner end point of the second part edge; and
   a second chute bottom which extends in the extension of the first chute bottom and separates two second part surfaces included in the secondary clearance surface, wherein
   the secondary clearance surface via a borderline transforms into a transition surface, which extends to the respective chip flute, the second chute bottom extending between the first chute bottom and a point where the borderline ends peripherally.

2. The drill body according to claim 1, further comprising first and second fluid ducts which mouth along respective second chute bottoms.

3. The drill body according to claim 2, wherein the two part surfaces in the primary clearance surface and the two second part surfaces in the secondary clearance surface are plane and spaced-apart by respective chute bottoms in the form of straight turning lines.

4. The drill body according to claim 1, wherein the two part surfaces in the primary clearance surface and the two second part surfaces in the secondary clearance surface are plane and spaced-apart by respective chute bottoms in the form of straight turning lines.

* * * * *